(12) United States Patent
Thomson et al.

(10) Patent No.: US 7,832,509 B2
(45) Date of Patent: Nov. 16, 2010

(54) TANDEM WHEEL ARRANGEMENT

(75) Inventors: Norval P. Thomson, Dunlap, IL (US);
Steven A. Daniel, East Peoria, IL (US);
Daniel Sergison, East Peoria, IL (US);
John V. Mount, Washington, IL (US)

(73) Assignee: Caterpillar Inc, Peoria, IL (US)

( * ) Notice: Subject to any disclaimer, the term of this patent is extended or adjusted under 35 U.S.C. 154(b) by 238 days.

(21) Appl. No.: 12/174,418

(22) Filed: Jul. 16, 2008

(65) Prior Publication Data

US 2010/0012401 A1   Jan. 21, 2010

(51) Int. Cl.
*B62D 61/02* (2006.01)
*B60K 17/04* (2006.01)

(52) U.S. Cl. ............. 180/24.11; 180/65.6; 280/677

(58) Field of Classification Search ......... 180/24.05, 180/24.06, 24.07, 24.08, 24.11, 55, 58, 59, 180/60, 65.1, 65.31, 65.51, 65.6, 202; 280/124.129, 280/676, 677, 682
See application file for complete search history.

(56) References Cited

U.S. PATENT DOCUMENTS

| | | | |
|---|---|---|---|
| 1,627,225 A | 5/1927 | Babel et al. | |
| 2,225,016 A | 12/1940 | Mallett et al. | |
| 3,603,423 A | 9/1971 | Schoonover | |
| 3,786,888 A | 1/1974 | Nelson | |
| 3,833,236 A | 9/1974 | Davis et al. | |
| 3,923,112 A | 12/1975 | Goodgame | |
| 4,205,730 A * | 6/1980 | McColl | 180/261 |
| 4,359,914 A | 11/1982 | Meisel, Jr. | |
| 4,460,196 A | 7/1984 | Perlini | |
| 4,756,550 A | 7/1988 | Raidel | |
| 5,333,895 A | 8/1994 | Fujan et al. | |
| 5,417,297 A | 5/1995 | Auer | |
| 7,258,182 B2 | 8/2007 | Auer | |
| 7,296,642 B1 * | 11/2007 | DeWald | 180/6.38 |
| 2010/0007118 A1* | 1/2010 | Sergison et al. | 280/676 |

* cited by examiner

*Primary Examiner*—Eric Culbreth
*Assistant Examiner*—Joseph Rocca
(74) *Attorney, Agent, or Firm*—Leydig, Voit & Mayer

(57) ABSTRACT

A machine (100) includes a frame that is pivotally connected to a tandem drive arrangement. The tandem drive arrangement includes a beam (120) and a first motor (128) having a first stator portion (202) connected to a first end of the beam (120). The first motor (128) also includes a first rotor portion (204) connected to a first drive wheel (118). A load sharing arrangement (412) is associated with the tandem drive arrangement and includes a first collar (414) rotatably disposed around the first stator portion (202) and a second collar (426) rotatably disposed around a portion of the beam (120). A first linkage (424) is pivotally connected between the first and second collars such that the load sharing arrangement (412) balances unbalanced loading in the tandem drive arrangement by transferring the unbalanced loading to the frame.

12 Claims, 4 Drawing Sheets

TANDEM WHEEL ARRANGEMENT

TECHNICAL FIELD

This patent disclosure relates generally to tandem wheel arrangements and, more particularly, to tandem wheel arrangements that include two or more wheels arranged in a tandem configuration.

BACKGROUND

Tandem wheel arrangements have two or more wheels arranged in line with each other. Earthmoving machines, for example, use tandem wheel arrangements for applications requiring traction and stability while operating over rough terrain. One such machine, for example, is a motor grader, which is a type of machine that is typically used to create a flat or graded surface on a landscape. Other examples of machines or vehicles having tandem drive arrangements include trucks, trains, moving platforms, gantry cranes, military vehicles, and so forth. Tandem wheel arrangements may employ hydraulic, electrical, or mechanical power to propel one or more of the wheels in the arrangement.

A typical drive configuration for tandem wheels includes a rotating input sprocket that powers one or more wheels of the arrangement via chains. The sprocket, chains, and associated gears are typically enclosed within an enclosure or beam, which is pivotally connected to the machine on the centerline of the sprocket. The chains are arranged to provide torque to each driven wheel and the input torque to the sprocket must equal the sum of the output torques to the wheels, otherwise, a moment may be applied to the tandem drive arrangement. This moment may cause instabilities, for example, by lifting a portion of the tandem wheel arrangement relative to another portion such that one or more wheels of the arrangement cannot fully engage the driving surface. A common application of tandem wheel arrangements include two wheels. Such arrangements typically have both wheels capable of powered rotation, preferably at equal torques, such that the tandem arrangement remains balanced and stable.

One example of a known drive torque balancing system can be seen in U.S. Pat. No. 3,786,888 (the '888 patent), which issued on Jan. 22, 1974. The '888 patent discloses a vehicular walking beam suspension system, which provides equal ground pressure under dynamic conditions. The drive system disclosed includes a gear reduction arrangement provided at each wheel hub that generates torque reactions at the wheels. These torque reactions are transferred directly and continuously back to the chassis of the vehicle via a system of beams and linkages.

One disadvantage of the drive system disclosed in the '888 patent is the relative complexity with which the various components of the drive arrangement are assembled. More particularly, the function of the linkages that equalize torques across the driven beam require that two different sets of bearings are disposed between the beam, the wheel hub, and the ring gear of the planetary gear system that is driving each of the wheels. The relatively high number of bearings (eight on either side of the vehicle for a total of sixteen) makes this arrangement less reliable and more prone to failure when subjected to severe service conditions in the field.

SUMMARY

The disclosure provides, in one aspect, a machine that includes a frame portion and a beam that is pivotally connected to the frame portion. A first motor is rigidly connected to the beam adjacent to a first end of the beam. The first motor is arranged to propel the machine by applying a torque to a first drive wheel. A second motor is also rigidly connected to the beam at a location that is adjacent to a second end of the beam. A second drive wheel is connected to the second motor and arranged to propel the machine when a second torque is applied to the second drive wheel from the second motor. The first and second drive wheels are arranged in a tandem configuration.

In another aspect, this disclosure provides a machine having a tandem drive arrangement. The tandem drive arrangement includes a beam that is pivotally connected to a frame of the machine. A first motor has a first stator portion connected to a first end of the beam and a first rotor portion connected to a first drive wheel. A load sharing arrangement is associated with the tandem drive arrangement and includes a first collar that is rotatably disposed around the first stator portion. A first pin boss is formed on the first collar and has a first pin opening formed therein. The load sharing arrangement further includes a second collar that is rotatably disposed around a different portion of the beam. A second pin boss is formed on the second collar and has a second pin opening formed therein. A first linkage pivotally connects the first collar with the second collar by at least partially surrounding a first pin that is disposed within the first pin opening and a second pin that is disposed within the second pin opening. The load sharing arrangement balances unbalanced loading in the tandem drive arrangement by transferring the unbalanced loading to the frame via the first linkage.

In yet another aspect, this disclosure provides a balanced tandem drive arrangement for a machine. The balanced tandem drive arrangement includes a beam that is pivotally connected to a frame of the machine at a pivot. A first motor is connected to the beam proximate to a first end thereof, and a first collar is disposed around a portion of the beam adjacent to the first motor such that the first collar is rotateable with respect to the beam. A first boss forming a first pin opening is defined on the first collar and extends radially outward with respect to the first collar. A second collar is disposed around an additional portion of the beam adjacent the pivot such that the second collar is rotateable with respect to the beam. A second boss forming a second pin opening is defined in the second collar, which extends radially outward with respect to the second collar. A first pin is disposed in the first pin opening and a second pin is disposed in the second pin opening. A first linkage has a first mating pin opening formed on a first end thereof and a second mating pin opening formed on a second end thereof. The first pin passes through the first mating pin opening and the second pin passes through the second mating pin opening to pivotally connect the first collar to the second collar via the first linkage.

DETAILED DESCRIPTION

A motor grader is used in the description that follows as an example for illustration of the various drive and load sharing arrangements that can be used on machines having tandem drive arrangements. As can be appreciated, any other vehicle having a tandem drive arrangement can benefit from the advantages described herein.

Figure 1A:
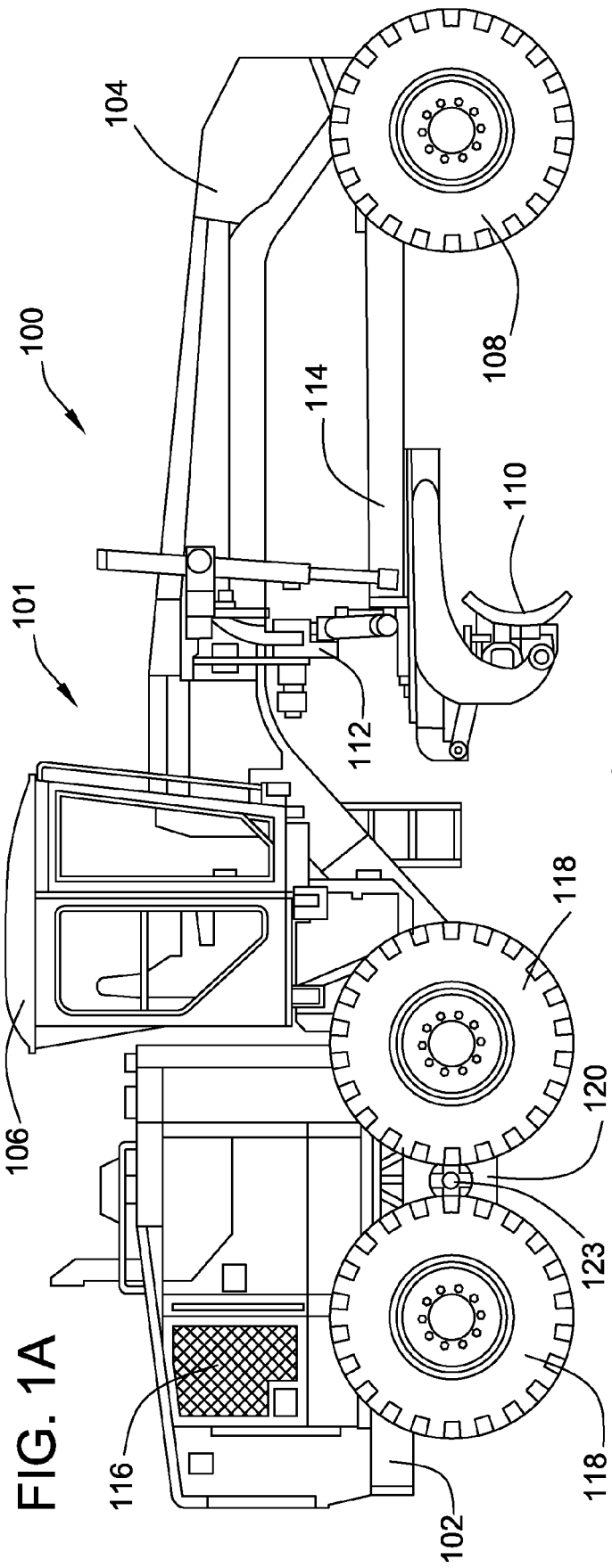
FIG. 1A and FIG. 1B are outline views of, respectively, a side and a bottom perspective of a motor grader machine in accordance with the disclosure.

A side view of a machine 100, in this example a motor grader 101, is shown in FIG. 1A. The term "machine" is used generically to describe any machine having at least one drive wheel that is directly driven by a motor connected to the wheel, for example, by use of electrical or hydrostatic power. A machine having a hydrostatically operated propel circuit for moving the machine across the terrain and a hydraulically operated implement circuit operating an implement for performing various machine tasks is described herein for the sake of illustration, but any other mode of powering the machine is contemplated, for example, by use of electrically operated motors and/or actuators. For instance, an alternative embodiment for the machine 100 may include a generator or another device capable of producing an alternative form of energy, such as electrical power.

Figure 1B:
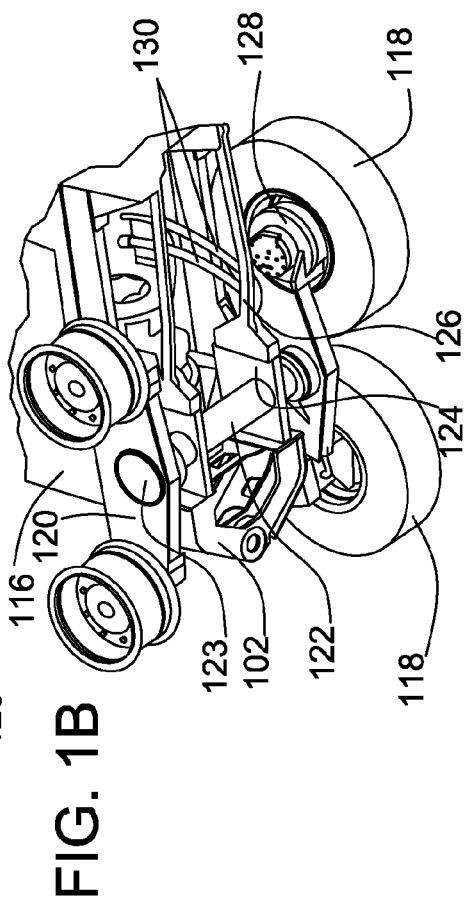

The motor grader 101 shown in FIG. 1 generally includes a two-piece frame made up of an engine frame 102 and an implement portion 104. Alternatively, the motor grader 101 may include a single frame piece. The engine frame 102 in the embodiment shown is connected to the implement portion 104 by a pivot (not shown). The implement portion 104 includes an operator cab 106 and two idle wheels 108 (only one visible) that contact the ground. A shovel or blade 110 is suspended along a mid-portion of the implement portion 104. The blade 110 can be selectively adjusted to engage the ground at various heights and angles to achieve a desired grade or contour while the motor grader 101 operates. Adjustment of the position of the blade 110 is accomplished by a system of actuators, generally denoted in FIG. 1A as 112, while support for the loading experienced by the blade 110 during operation is accomplished by a bar 114, which pivotally connects the implement portion 104 to the blade 110.

The engine frame 102 supports an engine (not visible), which is protected from the elements by an engine cover 116. The engine provides the power necessary to propel the motor grader 101 as well as to operate the various actuators and systems of the motor grader 101. As can be appreciated, other machines may have different configurations and/or various other implements associated therewith.

In a hydrostatically operated machine, the engine in the engine frame 102 may be associated with a hydrostatic pump (not shown), which may be part of a hydraulic system operating a propel system of the motor grader 101. In the embodiment shown, the motor grader 101 is driven by two sets of drive wheels 118 (only one set visible), with each set including two wheels 118 that are arranged in a tandem configuration along a beam 120. As can be more readily seen in the view of FIG. 1B, which is a bottom perspective of the engine frame 102 of the motor grader 101, two beams 120 are pivotally connected on the ends of a shaft or axle 122 at a respective pivot joint or bearing 123, with one beam 120 disposed on either side of the motor grader 101.

The axle 122, which is optional, is connected to the engine frame 102 of the motor grader 101 via two mounting plates 124 and two stabilizer bars 126, such that the drive wheels 118 can effectively propel the motor grader 101. In an alternative embodiment, the axle 122 may be omitted and the beams 120 may instead be pivotally connected directly to the engine frame 102. At least one or both of the two drive wheels 118 on the beam 120 may be actively rotated or driven by a corresponding motor 128. When only one wheel 118 is powered, the other wheel 118 may be idle or, stated differently, may be free to rotate relative to the beam 120. In the embodiment shown in FIG. 1B, for example, the drive wheel 118 shown toward the right hand side of the figure is powered by a motor 128, while the drive wheel 118 shown toward the left hand side of the figure is idle and, thus, does not have a motor 128 associated therewith. Two motors 128 may be connected, one each, at corresponding ends of the two beams 120. A set of conduits 130 (only one set shown) may connect each motor 128 to an appropriate circuit of the motor grader 101 that can supply power to operate the motors 128.

Figure 2:
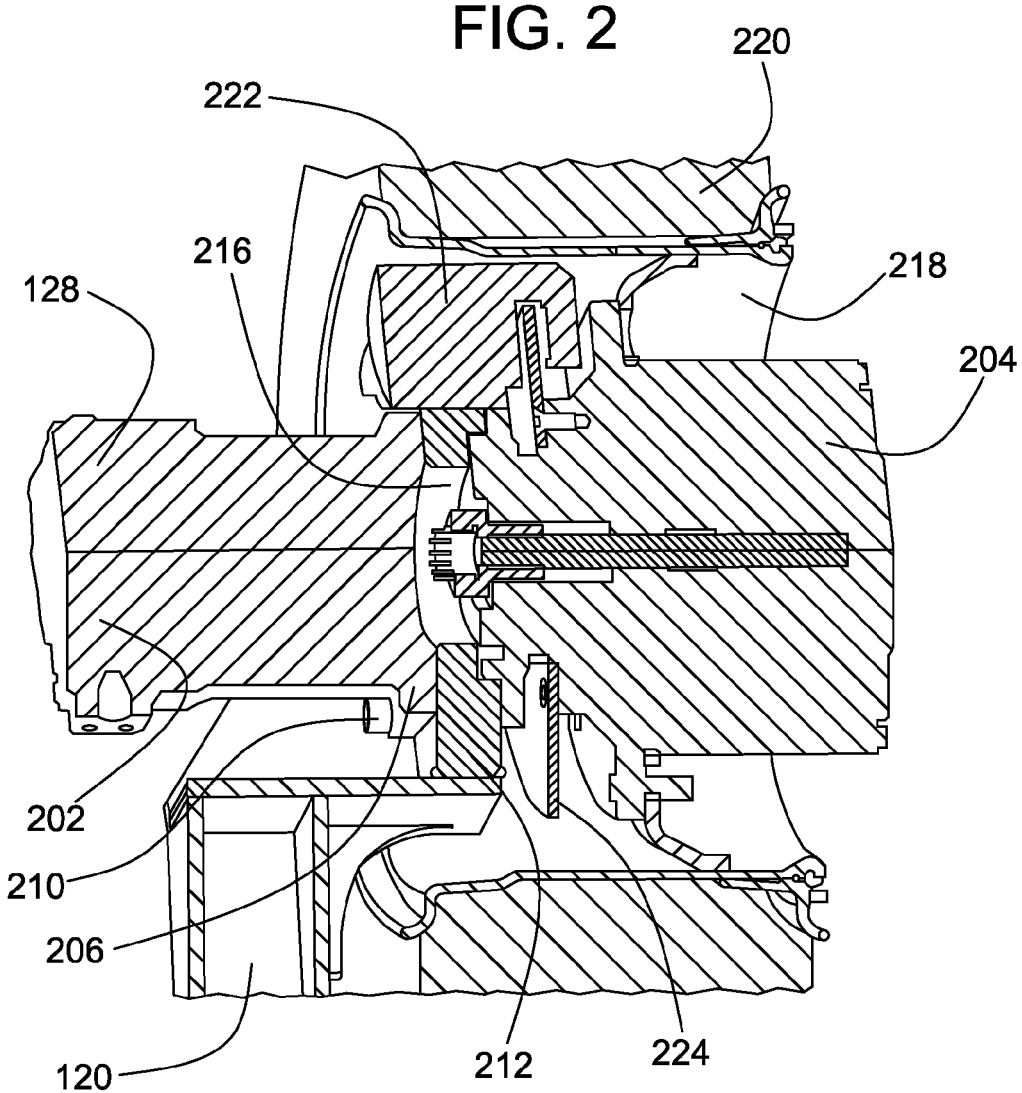
FIG. 2 is a cross section of one embodiment for a mounting arrangement between a motor and a beam in accordance with the disclosure.
Figure 3:
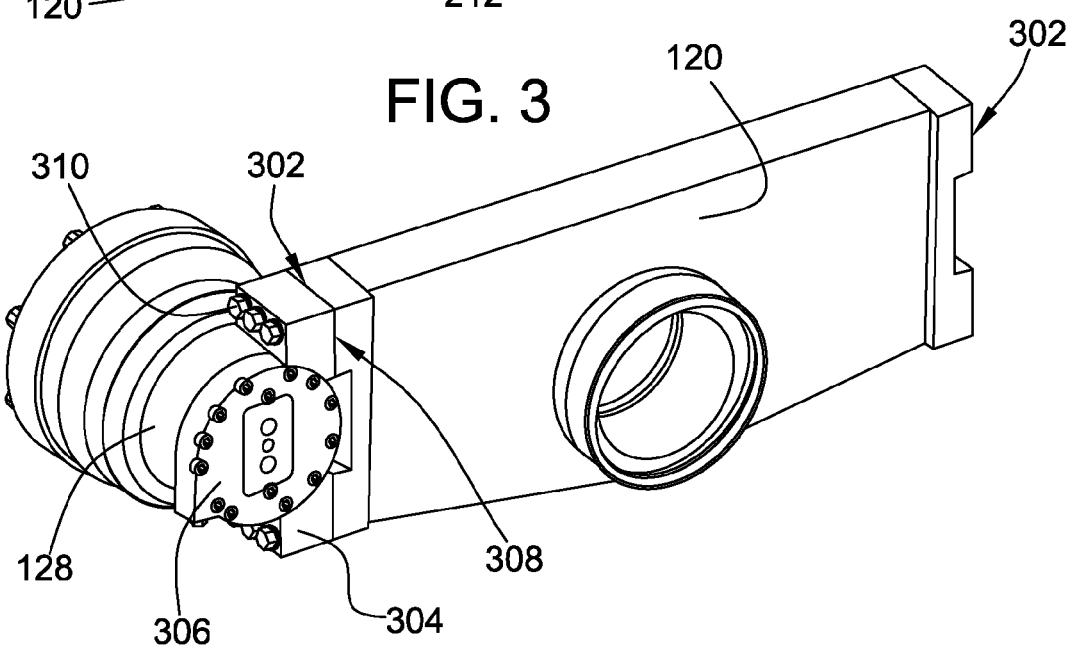
FIG. 3 is an outline view of a partially assembled motor to a beam in accordance with an alternate embodiment of the disclosure.

Detailed views of one connection configuration between the motors 128 and the beams 120 for two different embodiments of the present disclosure are shown in FIG. 2 and FIG. 3. FIG. 2 is a cross section through a motor 128 of a first embodiment. The motor 128 is may be a hydrostatically or electrically operated motor that is connected directly to an end of a beam 120. FIG. 3 is a partially assembled beam 120 of a second embodiment that has a motor 128 connected to an end of the beam 120 by a block. In the presentations of these figures, various surrounding components have been removed and like elements are denoted by like reference numerals as used in the foregoing description for the sake of simplicity, even though the structures described may differ in certain respects.

The section through the motor 128 in FIG. 2 has been simplified to remove some internal features of the motor 128 for the sake of illustration. Hence, various portions of the motor 128 are shown as solid in cross section, even though one skilled in the art may appreciate that motors include internal components that are not presented here. Turning now to the cross section of FIG. 2, the motor 128 includes a stator portion 202 rotatably connected to a rotor portion 204. The stator portion 202 forms a flange 206 having fastener openings that, in conjunction with fasteners 210, rigidly connect the stator portion 202 to the beam 120. More specifically, a flange 212 that is welded or otherwise connected to the beam 120, proximate an end thereof, forms a plurality of threaded holes that accommodate the fasteners 210. An opening 216 of the flange 212 surrounds one end of the rotor portion 204 of the motor 128. The rotor portion 204 is connected to a wheel rim 218 that, together with a tire 220 (partially shown), forms one of the drive wheels 118. An emergency brake actuator 222 is adapted to engage a brake disk 224.

Turning now to the second embodiment, which is shown in FIG. 3, the beam 120 has flat portions 302 formed on either of its ends. Each flat portion 302 forms a plurality of threaded fastener openings that threadably accept fasteners. In this embodiment, each of the motors 128 (only one shown) forms a mounting block 304 that is integrally formed around or connected with a stator portion 306 of the motor 128 or the stator portion of an unpowered wheel mounting arrangement (not shown). Each mounting block 304 forms a flat surface 308 that mates with one of the flat portions 302 of the beam 120 such that the corresponding motor 128 is aligned with the beam 120. Fasteners 310 connect the mounting block 304 to the end of the beam 120.

The two embodiments described thus far are alternative configurations for connecting a powered or idle drive wheel to a beam as part of a tandem drive arrangement that is used to drive a machine. As can be appreciated, other configurations that are not shown or described here may be used as substitutes or equivalents to the arrangements presented.

When operating one or more independently powered tandem wheels connected to a single beam, torque imbalances may appear that may be attributed to small inconsistencies in the operation of each tandem motor relative to the others. Such imbalances may be especially pronounced when fewer than all drive wheels in the tandem configuration are powered or when motion of the machine is initiated from a stop or otherwise changed during operation. In the case when all wheels in the tandem arrangement are powered, imbalances may still be present due to variations to the flow rate and pressure of the flow of hydraulic fluid operating each motor, small differences in torque output from electric motors, and so forth. These imbalances may result in perceptible variations in the smoothness of operation of the tandem drive arrangement.

Figure 4:
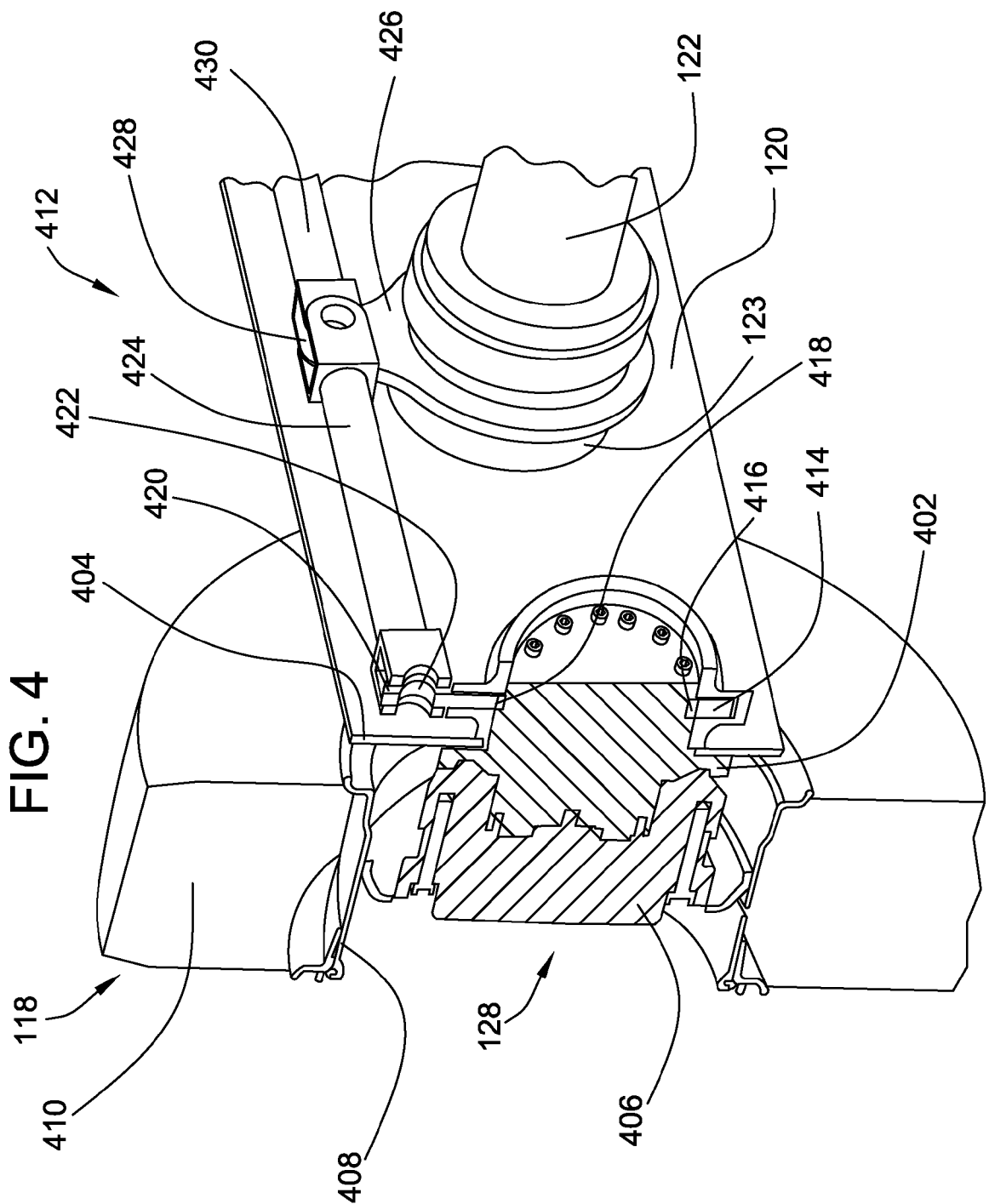
FIG. 4 and FIG. 5 are partial cross sections of a load sharing arrangement for a tandem drive system in accordance with the disclosure.

A load or torque balancing arrangement may be used in conjunction with a tandem wheel arrangement to reduce or eliminate such instability issues. One embodiment for a load sharing arrangement is shown in the partial cross section of FIG. 4. The partial cross section is taken through the center of one of the drive wheels 118 of the machine 100 and extends through a portion of the beam 120. It is noted that the connection between the motor 128 and beam 120 constitutes a third embodiment for the connection between these two components.

Here, the motor 128 includes a stator portion 402 that is rigidly connected to a substantially flat element 404 formed on a portion of the beam 120. A rotor portion 406 of the motor 128 is connected to a wheel rim 408 that, along with a tire 410, forms the drive wheel 118. As can be appreciated, a drive arrangement using electrical motors (not shown) having stator and rotor portions would operate in much the same or similar fashion as the hydrostatic motors shown and described in terms of the connections between each of the portions of the motor and surrounding machine components. Moreover, even idle or unpowered wheels might have a stator portion of a mounting arrangement connected to the beam 120, while a rotor portion that is free to rotate relative to the stator portion might be connected to a wheel hub.

Figure 5:
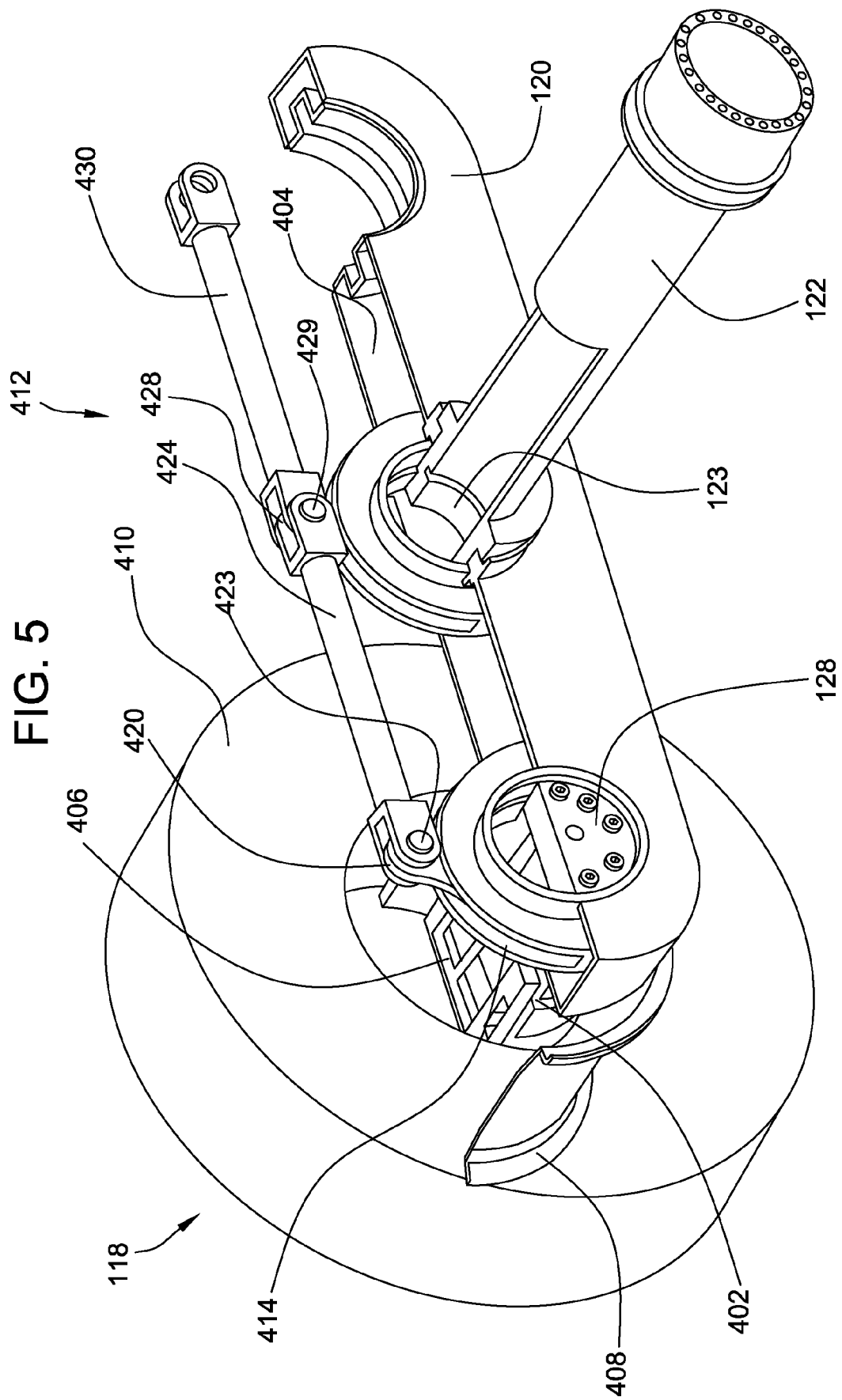

During operation, the rotor portion 406 rotates with respect to the stator portion 402 by imparting a torque over the rotation of the drive wheel 118 when the wheel 118 is powered. A second drive wheel (not shown) is connected to an opposite end (not shown) of the beam 120. The torque or power imparted to the drive wheels 118 is balanced with respect to the beam 120 while the machine is in motion. However, when motion of the machine 100 is first initiated or when the machine is decelerating, torque imbalances may be created that, for example, may tend to tip the beam 120 with respect to the ground or, stated differently, may tend to rotate the beam 120 with respect to the axle 122 about the pivotal connection or bearing 123 therebetween. To address such issues, a load sharing arrangement 412 acts to balance the loading on the beam 120 and maintain the weight carried by both drive wheels 118 generally constant. A first embodiment of the load sharing arrangement 412 will now be described in more detail in conjunction with FIG. 5.

The load sharing arrangement 412 includes a first collar 414 rotatably disposed around a portion of the stator portion 402 of the motor 128 that is seen in the forefront of the figure. A ball bearing 416 may extend circumferentially around at least a portion of an opening 418 formed in the first collar 414 such that friction and other hindrances to the rotational motion between the first collar 414 and the stator portion 402 are reduced. The first collar 414 forms an extension or a first boss 420 extending in a radially outward direction from the opening 418. A first pin opening 422 is formed in the boss 420 such that a first pin 423 can pivotally connect the first collar 414 with a first linkage 424.

In a similar arrangement, a second collar 426 is rotatably connected around a portion of the beam 120. The second collar 426 forms a second boss 428 having a second pin opening 431 that accommodates a second pin 429 pivotally connecting the second collar 426 to an opposite end of the first linkage 424. As can be appreciated, the first linkage 424 in this arrangement, along with the portion of the beam 120 extending between the axle 122 and the motor 128, and further, along with the first collar 414 and the second collar 426, forms a four-bar-linkage arrangement. Moreover, even though a motor 128 is shown disposed within the opening 418, any other wheel mounting arrangement that is either powered or idling may be used.

During operation, any net torque that remains unbalanced, even instantaneously as it acts on the beam 120, will be transferred from the beam 120 to the axle 122 through the first linkage 424 and, therefore, to the frame of the machine 100. In a similar fashion, as shown in the partial assembly of FIG. 5, a third collar (not shown) may be connected on an opposite end of the beam 120 and to a second linkage 430 via a third pin (not shown). The second linkage 430 is connected to the second collar 426 at the second pin 429 such that load imbalances created on the opposite end of the beam 120 can be transferred to the engine frame 102. Thus, the beam 120 may advantageously remain balanced at all times, even though the first linkage 424 and the second linkage 430 may not carry any load when the machine 100 is in steady operation or if there are no torque imbalances otherwise created.

INDUSTRIAL APPLICABILITY

The present disclosure is applicable to machines using tandem wheel configurations having one or more wheels directly powered by motors. Although a motor grader is illustrated in FIG. 1, the term "machine" may refer to any machine that performs some type of operation associated with an industry such as mining, construction, farming, transportation, or any other industry known in the art. The machine 100 (FIG. 1) may alternatively be a wheel loader, excavator, dump truck, backhoe, material handler or the like. Similarly, although a blade 110 (FIG. 1) is illustrated as the attached implement, an alternative implement may be included. Any implements may be utilized and employed for a variety of tasks, including, for example, loading, compacting, lifting, brushing, and include, for example, buckets, compactors, forked lifting devices, brushes, grapples, cutters, shears, blades, breakers or hammers, augers, and others.

Further, even though a tandem drive arrangement is described relative to use of motors, one can appreciate that the devices and methods for balancing load described herein are equally applicable to drive arrangements using different forms of motive devices, for example, electric motors, pneumatic devices, and so forth, and may even be applicable to other industries, for example, electrically driven wheels for trucks associated with rail cars, etc. Regardless of the type of machine used or the type of implement employed, the methods described herein are advantageously capable of improving the performance of any machine by increasing fuel economy and decreasing stopping distances for machines having tandem drive arrangements by ensuring that all drive wheels of the machine are in contact with a substrate surface and share their load equally.

We claim:
1. A machine, comprising:
   a frame;
   a tandem drive arrangement that includes
      a beam pivotally connected to the frame, and a first motor having a first stator portion connected to a first end of the beam and a first rotor portion connected to a first drive wheel;
a load sharing arrangement associated with the tandem drive arrangement, the load sharing mechanism including:
a first collar rotatably disposed around the first stator portion;
a first pin boss formed on the first collar, the first pin boss forming a first pin opening;
a second collar rotatably disposed around a portion of the beam;
a second pin boss formed on the second collar, the second pin boss forming a second pin opening;
a first pin disposed within the first pin opening;
a second pin disposed within the second pin opening; and
a first linkage pivotally connecting the first collar with the second collar by at least partially surrounding the first pin and the second pin;
wherein the load sharing arrangement balances unbalanced loading in the tandem drive arrangement by transferring the unbalanced loading to the frame via the first linkage.

2. The machine of claim 1, wherein the tandem drive arrangement further includes a second drive wheel that is connected to the beam and that is arranged for unpowered rotation relative to the beam.

3. The machine of claim 1, wherein the beam, the first collar, the first linkage, and the second collar, together form a four-bar-linkage arrangement that is arranged to transfer loads from the first motor to the frame.

4. The machine of claim 1, wherein the load sharing arrangement further includes:
a third collar rotatably disposed around the second stator portion;
a third pin boss formed on the third collar, the third pin boss forming a third pin opening;
a third pin disposed within the third pin opening; and
a second linkage pivotally connecting the second collar with the third collar by at least partially surrounding the second pin and the third pin;
wherein the beam, the second collar, the second linkage, and the third collar, form an additional four-bar-linkage arrangement that is arranged to transfer loads from the second motor to the frame.

5. The machine of claim 1, wherein the machine is a motor grader.

6. A balanced tandem drive arrangement for a machine, the machine having a frame, the balanced tandem drive arrangement comprising:
a beam pivotally connected to the frame of the machine at a pivot;
a first motor connected to the beam proximate a first end thereof;
a first collar disposed around a portion of the beam adjacent to the first motor, wherein the first collar is rotateable with respect to the beam;
a first boss forming a first pin opening defined on the first collar, the first boss extending radially outward with respect to the first collar;
a second collar disposed around an additional portion of the beam adjacent the pivot, wherein the second collar is rotateable with respect to the beam;
a second boss forming a second pin opening defined in the second collar, the second boss extending radially outward with respect to the second collar;
a first pin disposed in the first pin opening;
a second pin disposed in the second pin opening; and
a first linkage pivotally connecting the first collar with the second collar, the first linkage having a first mating pin opening formed on a first end thereof and a second mating pin opening formed on a second end thereof;
wherein the first pin passes through the first mating pin opening and the second pin passes through the second mating pin opening to pivotally connect the first collar to the second collar via the first linkage.

7. The balanced tandem drive arrangement of claim 6, further including:
a second motor connected to the beam proximate a second end thereof;
a third collar disposed around a portion of the beam adjacent to the second motor, wherein the third collar is rotateable with respect to the beam;
a third boss forming a third pin opening defined on the third collar, the third boss extending radially outward with respect to the third collar;
a third pin disposed in the third pin opening; and
a second linkage pivotally connecting the second collar with the third collar, the second linkage having a third pin mating opening formed on a first end thereof and a fourth pin mating opening formed on a second end thereof;
wherein the second pin passes through the fourth pin mating opening and the third pin passes through the third pin mating opening to pivotally connect the third collar to the second collar via the second linkage.

8. The balanced tandem drive arrangement of claim 6, further including a first bearing disposed between the first collar and the beam, and a second bearing disposed between the second collar and the additional portion of the beam.

9. The balanced tandem drive arrangement of claim 6, wherein the first motor is a hydrostatic motor.

10. The balanced tandem drive arrangement of claim 6, wherein the first motor is an electric motor.

11. The balanced tandem drive arrangement of claim 6, wherein the beam, the first collar, the first linkage, and the second collar define a four-bar mechanical linkage such that, at all times during operation, the first linkage is substantially parallel to the beam.

12. The balanced tandem drive arrangement of claim 6, wherein the machine is a motor grader.

* * * * *